(12) United States Patent
Campeau et al.

(10) Patent No.: US 9,181,441 B2
(45) Date of Patent: Nov. 10, 2015

(54) COATING OR POLYMERIC LABELS

(75) Inventors: Anne P. Campeau, Rochester, NY (US);
Dennis E. Mcgee, Penfield, NY (US);
Kevin A. Kirk, Farmington, NY (US)

(73) Assignee: JINDAL FILMS AMERICAS LLC, Macedon, NY (US)

( * ) Notice: Subject to any disclaimer, the term of this patent is extended or adjusted under 35 U.S.C. 154(b) by 0 days.

(21) Appl. No.: 13/581,481

(22) PCT Filed: Mar. 23, 2011

(86) PCT No.: PCT/US2011/029517
§ 371 (c)(1),
(2), (4) Date: Oct. 4, 2012

(87) PCT Pub. No.: WO2011/129964
PCT Pub. Date: Oct. 20, 2011

(65) Prior Publication Data
US 2013/0065019 A1    Mar. 14, 2013

Related U.S. Application Data

(60) Provisional application No. 61/323,219, filed on Apr. 12, 2010, provisional application No. 61/382,656, filed on Sep. 14, 2010.

(51) Int. Cl.
| | |
|---|---|
| *B32B 5/16* | (2006.01) |
| *B32B 3/30* | (2006.01) |
| *B32B 3/10* | (2006.01) |
| *B32B 19/02* | (2006.01) |
| *B32B 3/26* | (2006.01) |
| *C09D 7/12* | (2006.01) |
| *B32B 27/08* | (2006.01) |
| *C08J 7/04* | (2006.01) |
| *G09F 3/02* | (2006.01) |

(52) U.S. Cl.
CPC ............... *C09D 7/1283* (2013.01); *B32B 3/10* (2013.01); *B32B 3/26* (2013.01); *B32B 3/30* (2013.01); *B32B 5/16* (2013.01); *B32B 19/02* (2013.01); *B32B 27/08* (2013.01); *C08J 7/042* (2013.01); *C08J 7/047* (2013.01); *C09D 7/1216* (2013.01); *G09F 2003/0233* (2013.01); *Y10T 428/24372* (2015.01); *Y10T 428/24893* (2015.01); *Y10T 428/24942* (2015.01); *Y10T 428/24999* (2015.04); *Y10T 428/249953* (2015.04); *Y10T 428/249974* (2015.04); *Y10T 428/249976* (2015.04); *Y10T 428/249986* (2015.04); *Y10T 428/249991* (2015.04); *Y10T 428/249992* (2015.04); *Y10T 428/249993* (2015.04); *Y10T 428/25* (2015.01); *Y10T 428/254* (2015.01); *Y10T 428/256* (2015.01); *Y10T 428/257* (2015.01); *Y10T 428/258* (2015.01); *Y10T 428/259* (2015.01)

(58) Field of Classification Search
CPC ........................ B32B 19/02; G09F 2003/0233
See application file for complete search history.

(56) References Cited

U.S. PATENT DOCUMENTS

| | | | |
|---|---|---|---|
| 3,013,901 A | 12/1961 | Bugosh | |
| 3,384,993 A | 5/1968 | Kane | |
| 3,480,463 A | 11/1969 | Rankin | |
| 3,928,697 A | 12/1975 | Mallinson et al. | |
| 3,937,854 A | 2/1976 | Shank, Jr. | |
| 4,214,039 A | 7/1980 | Steiner et al. | |
| 4,679,794 A | 7/1987 | Yamada et al. | |
| 4,690,981 A | 9/1987 | Statz | |
| 4,758,462 A | 7/1988 | Park et al. | |
| 4,965,123 A | 10/1990 | Swan et al. | |
| 5,209,854 A | 5/1993 | Reed et al. | |
| 5,209,884 A | 5/1993 | Wood, Jr. | |
| 5,380,587 A | 1/1995 | Musclow et al. | |
| 5,382,473 A | 1/1995 | Musclow et al. | |
| 5,387,470 A | 2/1995 | Parnell et al. | |
| 5,397,635 A | 3/1995 | Wood, Jr. | |
| 5,419,960 A | 5/1995 | Touhsaent | |
| 5,662,985 A | 9/1997 | Jensen et al. | |
| 5,705,451 A * | 1/1998 | Takao et al. | 428/206 |
| 5,736,253 A | 4/1998 | Hinchcliffe et al. | |
| 5,789,123 A | 8/1998 | Cleckner et al. | |
| 5,827,627 A | 10/1998 | Cleckner et al. | |
| 5,891,552 A | 4/1999 | Lu et al. | |
| 5,984,806 A | 11/1999 | Sullivan et al. | |
| 6,022,612 A | 2/2000 | Wilkie | |
| 6,025,059 A | 2/2000 | McGee et al. | |
| 6,210,764 B1 | 4/2001 | Hayes | |
| 6,257,149 B1 | 7/2001 | Cesaroni | |
| 6,303,233 B1 * | 10/2001 | Amon et al. | 428/516 |
| 6,362,273 B1 | 3/2002 | Martin et al. | |
| 6,465,591 B1 | 10/2002 | Lee | |
| 6,555,625 B1 | 4/2003 | Overbeek et al. | |

(Continued)

FOREIGN PATENT DOCUMENTS

| | | |
|---|---|---|
| EP | 0 341 886 | 11/1989 |
| EP | 0 630 388 | 12/1994 |
| EP | 0 961 177 | 12/1999 |
| JP | 2001/072939 | 3/2001 |
| WO | WO 01/12447 | 2/2001 |

*Primary Examiner* — David Sample
*Assistant Examiner* — Donald M Flores, Jr.

(57) ABSTRACT

This invention provides a polymer film coating for use preferably with cold glue labels, particularly on the adhesive-receiving side of a label film. The coating includes a filler component and a binder component, at least one of which is hydrophobic. The coating imparts water resistance and solvent resistance to an adhered label, thereby improving resistance to label removal due to moisture or water contact. A coated label and method of applying the coating to a label film are also included.

25 Claims, No Drawings

(56) References Cited

U.S. PATENT DOCUMENTS

| | | |
|---|---|---|
| 6,596,379 B2 | 7/2003 | McGee |
| 6,610,784 B1 | 8/2003 | Overbeek et al. |
| 6,623,866 B2 | 9/2003 | Migliorini et al. |
| 6,730,733 B2 | 5/2004 | Overbeek et al. |
| 6,761,969 B2 | 7/2004 | Li et al. |
| 6,844,034 B2 | 1/2005 | Touhsaent |
| 6,893,722 B2 | 5/2005 | McGee |
| 6,939,602 B2 | 9/2005 | McGee et al. |
| 7,288,304 B2 | 10/2007 | Squier |
| 2002/0028288 A1 | 3/2002 | Rohrbaugh et al. |
| 2002/0049100 A1 | 4/2002 | Winskowicz |
| 2002/0146520 A1 | 10/2002 | Squier et al. |
| 2002/0146559 A1 | 10/2002 | Touhsaent |
| 2002/0182390 A1 | 12/2002 | Migliorini et al. |
| 2003/0172559 A1 | 9/2003 | Squier |
| 2003/0188822 A1 | 10/2003 | Kuroki et al. |
| 2003/0198885 A1 | 10/2003 | Tamagawa et al. |
| 2004/0109997 A1 | 6/2004 | Li et al. |
| 2004/0126514 A1 | 7/2004 | McGee et al. |
| 2004/0152819 A1 | 8/2004 | Cuch |
| 2004/0220378 A1 | 11/2004 | Kuntimaddi et al. |
| 2005/0100687 A1* | 5/2005 | Dutton et al. ............... 428/32.23 |
| 2005/0112334 A1 | 5/2005 | Servante et al. |
| 2005/0179759 A1 | 8/2005 | Yoshida et al. |
| 2006/0046005 A1 | 3/2006 | McGee |
| 2007/0248810 A1 | 10/2007 | McGee et al. |
| 2008/0009413 A1* | 1/2008 | O'Brien et al. ................ 503/227 |
| 2010/0055371 A1 | 3/2010 | Edwards et al. |
| 2012/0282447 A1* | 11/2012 | Gringoire et al. ............. 428/216 |

* cited by examiner

COATING OR POLYMERIC LABELS

CROSS-REFERENCE OF RELATED APPLICATIONS

The application claims priority and the benefit of U.S. Provisional Application Ser. No. 61/323,219, filed Apr. 12, 2010, U.S. Provisional Application Ser. No. 61/382,656, filed Sep. 14, 2010, and PCT/US2011/029517, filed Mar. 23, 2011, the contents of which are incorporated by reference in their entirety.

BACKGROUND OF THE INVENTION

Polymeric labels are applied to a variety of bottles, containers and other surfaces to provide, for example, information about the product being sold or to display a trade name or logo. Polymeric labels can provide various advantageous characteristics not provided by paper labels, such as durability, strength, water resistance, curl resistance, abrasion resistance, gloss, translucence, and others.

The application of cut paper labels to glass and plastic containers using water-based adhesives is still one of the most prevalent labeling techniques. Consequently, there are many existing machines that have been installed for this type of labeling. These cut-label/patch-label labeling techniques using water-based adhesives work well with paper-based labels applied to glass, plastic, or metal substrates, because the wet adhesive wicks into and through the paper label. This release of the adhesive moisture through the labels allows the adhesive to dry fully. This technique does not work, however, on polymeric labels because the polymeric label does not permit wicking of the moisture from the adhesive when used as a decal on a window or a patch-label on a container. This can make the polymeric labels adhered with cold-glue type adhesives prone to "swimming" or moving from the desired label location during downstream processing.

Polymeric label substrates having micro perforations to enhance the rate at which water trapped between the label and the substrate can evaporate have had little success. Initial wet tack with commercially available water-based adhesives remained inadequate. Moreover, the micro perforations tend to permit the passage of wet glue through the pores rendering the printed side of label on the container sticky and marring the graphics.

It is known in the art to construct a multilayer film having a coating layer on the wet-adhesive-receiving surface of the film that includes a filler component. These films can offer fair performance as labels when attached to containers with aqueous-based cold glues. However, these films are known to have manufacturing and processing issues.

There remains in the art need for a polymeric label that can be applied using conventional, converting, printing, cutting, handling, and labeling equipment in conjunction with common inks, aqueous fountain solutions, solvents, coatings, and adhesives. Particularly, there is a need for a polymeric label structure that performs well in printing presses that require substrates in sheet form as well as conversion of these films from roll stock into unprinted sheets, and the stacking of the sheets.

SUMMARY OF THE INVENTION

In one aspect, the embodiments of the present invention provide polymeric label structures that are suitable for cut and stack as well as roll-fed processes. Unlike some polymeric label structures, embodiments of the invention include a filler component of a particular size in the adhesive coating layer. It has been discovered that where the size of the filler is carefully controlled, the label may retain their suitability for cut and stack processes and reduce ghosting effects. These undesirable effects are observed in label structures lacking a filler or including a filler that is too small. It has been discovered, however, that where the filler is too large, stacking or rolling the labels can result in print face deformation. Thus, embodiments of the invention provide a coated thermoplastic film comprising:
  (a) a polymeric substrate comprising:
    (i) a first skin layer comprising a polymer, wherein the first skin layer has a first side and a second side;
    (ii) a core layer comprising a polymer, wherein the core layer has a first side and a second side, and the first side of the core layer is adjacent to the second side of the first skin layer; and
  (b) a first coating on the first side of the first skin layer, the first coating comprising at least a first filler component, the filler component comprising particles having a mean diameter in the range of 5 to 20 µm and a first binder component, wherein at least one of the first filler component and the first binder component is substantially hydrophobic.

In some embodiments, the first skin layer is voided. Embodiments also include films that include a second skin layer adjacent to the second side of the core layer. Such second skin layers may be voided.

In some embodiments, including embodiments where the first and/or second skin layer is voided, the core layer may be a multilayer core. Thus, in some embodiments, a central core layer is in surface contact with the first and/or second skin layer, while in other embodiments, the multilayer core includes one or more tie layers that are in surface contact with the one or more of the skin layers.

In particular embodiments, the filler component comprises particles having a mean diameter in the range of 8 to 18 µm, particularly 5 to 15 µm. Any suitable filler component may be used. In some embodiments, the filler component comprises polyolefin, particularly polyethylene, more particularly polyethylene wax particles.

Particular embodiments provide a coated label film for use with a cold glue adhesive, the label film comprising:
  (a) a polymeric substrate comprising:
    (i) a first skin layer comprising a polymer, wherein the first skin layer has a first side and a second side and is voided;
    (ii) a core layer comprising a polymer, wherein the core layer has a first side and a second side, and the first side of the core layer is adjacent to the second side of the first skin layer; and
  (b) a first coating on the first side of the first skin layer comprising at least a first filler component the filler component comprising polyethylene homopolymer or copolymer particles having a mean diameter in the range of 5 to 20 µm and <2.0 number % of the filler particles have a diameter >75.0 µm, a first binder component, the first binder comprising:
    (i) at least an ionomer having about 65 wt % to about 95 wt % of polymer units derived from at least one of ethylene, propylene, and butylene; and from about 5 wt % to about 35 wt % of polymer units derived from at least one of acid-group containing comonomer selected from acrylic acid, methacrylic acid, crotonic acid, maleic acid, itaconic acid and mixtures thereof;
    (ii) an acrylic emulsion; and
    (iii) a first cross-linking agent;
  wherein at least one of the first filler component and the first binder component is substantially hydrophobic.

Embodiments of the invention provide films having a coating that renders the coating useful on either or both sides of the label. Such films reduce ghosting while also reducing print face deformation induced in large rolls or stacks of films. Thereby, embodiments of the invention may reduce the manufacturing, converting, and processing difficulties encountered in the prior art when using water-based adhesives and/or solvent-based inks and/or over-lacquers in combination with a polymeric label.

In another aspect, embodiments of the invention provide a method of labeling an article with a resistant coated polymeric label using a cold glue adhesive comprising the steps of: a) providing an article comprising a labeling surface; b) providing a polymeric label substrate having a first side and a second side, wherein the first side is an adhesive-receiving side; c) applying a first coating to the first side of the polymeric label substrate, the coating comprising at least a filler component the filler component comprising particles having a mean diameter in the range of 5 to 20 μm and a binder component, wherein at least one of the filler component and the binder component is substantially hydrophobic; d) thereafter applying a cold glue adhesive to the coating; and e) thereafter applying polymeric label to the article to produce a labeled article. The coating is resistant degradation from both water and solvent and may be defined for purposes herein as a "resistant coating" or a "water- and solvent-resistant coating". The term "coating" as used herein, thus refers to a coating formulation that is both water resistant and solvent resistant.

DETAILED DESCRIPTION OF THE INVENTION

Embodiments of the invention comprise films coated on at least one side with a coating formulation possessing at least one hydrophobic-behaving component therein, yielding a coated polymeric-based film exhibiting hydrophobic behavior or properties. Such hydrophobic behavior or properties may be beneficial during at least one or more of: i) converting, such as printing, sheeting, die-cutting, and further coating; ii) uses/applications, such as labeling, packaging, applying adhesive, and application of the adhesive-containing label to a container, such as a bottle; and iii) subsequent handling and use, such as ice-chest immersion and wet scratch resistance.

The term "mean diameter" is defined broadly to encompass substantially the mean based on the number of particles in a sample of any linear distance across or through a particle having a relatively low aspect ratio, or distance across the long-axis of particles having a high aspect ratio, such as a plate-like particle, or the nominal distance through a nominally spherical particle, as the filler particles may comprise substantially any shape. When applied over the inherently rough first/adhesive-receiving side of the first skin layer, filler materials provide enough effective porosity to allow moisture permeation and mechanical penetration of the water component of the wet glue and/or of the wet glue itself, through the coating layer to the voided sub-layer adjacent to the coating. Insufficient particulate loading or a coating layer that is too thick can diminish retained cold glue adhesion when labeled bottles are immersed in ice water. The mean particle diameter may be determined by any suitable method, particularly by optical microscopic evaluation of the particles, preferable based on a sample size of at least 100 particles or according to ASTM D422.

The term "hydrophilic," as used herein, means to be readily wettable by water, having relatively low advancing contact angles with water, (e.g., less than about 45°) thereby being capable of binding or absorbing water. "Hydrophobic," as used herein, is also defined to mean anything other than hydrophilic, including being water resistant or not being readily water wettable.

The First Coating

Coating formulations according to this invention comprise at least a filler component and a binder component, wherein at least one of these two components has substantially hydrophobic wetting properties and is thereby resistant to water degradation. In addition to the coating being resistant to degradation from water, the coating formulations are also resistant to solvent degradation. As described in more detail below, solvent resistance is typically imparted by the binder components, such as binders that are crosslinked using a crosslinker or which self-adhere, such as through polar bonding or self-crosslinking. Many embodiments of the coating composition comprise a combination of hydrophobic polymer binders, filled primarily with hydrophobic filler particles, and including minor amounts of other additives, such as another polymer compound, organic or inorganic particles, silica gel, and/or other known formulating and processing additives, such as wetting agents, surfactants, security taggants, pH modifiers, and buffering agents.

Other coating formulations according to this invention comprise a hydrophobic binder, as described herein, in combination with a hydrophilic filler, with the binder thereby imparting a predominant portion of the water resistance, solvent resistance, and the wet-scratch resistance, while the filler imparts moisture transmission through the coating. The combination of filler and binder render the coating resistant to degradation from fluid contact when the coating is applied to the adhesive-receiving surface and resistant to wet-scratch damage when the coating is applied to the print surface. The filler may be hydrophobic or hydrophilic, but the combination of filler and binder together impart both hydrophobicity and resistance to degradation from solvents. Thus, in many embodiments, the binder component is resistant to both water and solvents. However, in embodiments where the filler is substantially hydrophobic, the binder material need not be as hydrophobic in nature and in some embodiments may permissibly contain some hydrophilic components or may be substantially hydrophilic but comprise a crosslinker to improve solvent resistance. Also, in all coating embodiments applied to the adhesive-receiving surface of a film, the filler component must be present, but in some embodiments, the filler component need not be present in the coating used on the print face, even though the binder is the same one utilized on the adhesive receiving surface.

In a cold-glue labeling film embodiment possessing at least a core layer and opposing skin layers, the coating according to this invention may be applied to the cold-glue adhesive-receiving first side of the first skin layer. This coating preferably comprises at least one polymer of the group comprising acrylics, urethanes, hardened epoxies, alkyds, polystyrene copolymers, poly(vinylidene chloride) copolymers, butadiene copolymers, vinyl ester copolymers, nitrocellulose, and olefin copolymers, cross-linked, if necessary, to render them resistant to water and polar ink solvents (alcohols, esters, and ketones).

Preferably, the water- and solvent-resistant coating for the adhesive-receiving side has a coating weight in the range of about 0.4 g/m² to about 4.0 g/m², or more preferably, a coating weight in the range of about 0.6 g/m² to about 2.5 g/m², or still more preferably, a coating weight in the range of about 0.8 g/m² to about 2.0 g/m².

Coating weights may be slightly higher when the coating is used on the print side as compared to weights on the adhesive-receiving side. Print-side weights may be as high as about 8 g/m², but practical and economic factors make the preferred ranges for the print-side coating, if used at all, the same as the preferred coating weights for the adhesive-receiving side. The water- and solvent-resistant coating preferably forms a continuous layer on the film surface, but may alternatively be applied in a pattern or non-continuous layer.

The preferred coating thickness in this invention is typically lower than the preferred thicknesses disclosed in Examples 1 through 4 of U.S. Pat. No. 6,517,664 (2.4 g/m² to 6.5 g/m²), as the coating of the '664 patent is hydrophilic and designed to readily absorb and/or contain some water and/or adhesive within the coating layer. Conversely, the coating formulations according to this invention do not appreciably absorb or contain the water and/or adhesive. Rather, the coatings according to this invention enhance the transmissibility of moisture through the coating layer to the adjacent polymer-receiving layer. The function of a coating material according to this invention is somewhat analogous to the function of size-exclusion chromatography beads; by reducing the available free volume in the chromatography column, larger molecules will elute ahead of smaller molecules. Likewise, with a somewhat porous hydrophobic matrix coated on the adhesive-receiving side of the film, hydrophilic materials like water will have less available free volume in the coated polymer layer and will readily penetrate through the coating to the voided/cavitated sub-layer of polymer film adjacent to the coated layer. In addition to enhanced initial wet-tack, the hydrophobic coating provides additional benefits including resistance to degradation of adhesives and printing inks by providing a water- and solvent-resistant protective coating. Solvent resistance is imparted by the binder components, such as by using a crosslinker, either as an additive component or a self-crosslinking polymer, with a hydrophobic or a hydrophilic binder, and/or using a binder that has polar properties against solvents in conjunction with a crosslinker to impart water resistance. Such benefits may provide improved ice chest immersion and wet scratch resistance, as discussed below in more detail. As used herein, the term "voided" is synonymous with the term "cavitated" as those terms are commonly understood within the art, referring to the creation of cavities, pores, or voids within a polymer film during orientation, whether using a void initiating agent or particle, such as calcium carbonate, or without a void initiating agent, such as orienting the beta-form of polypropylene to create voids.

The presence of the water- and solvent-resistant coating on the adhesive-receiving surface in a preferred amount improves the processability of sheets and labels after printing compared to uncoated films. Printed sheets jog and stack better. Blocking during die-cutting is reduced and printed sheets are deformed less due to interactions with ink solvents and the polymer. Coating layers that are too thin on the print side may not provide adequate resistance to residual ink solvents, and coating layers that are too thick on the glue side may interfere with the interaction between wet glue and the voided sub-layer adjacent the coating. Surprisingly, however, within the ranges taught herein, the coating of this invention does not interfere with cold-glue tack-up and still permits interaction between the wet glue and the voided sub-layer.

Solvent resistance can be determined by manually rubbing the coated film surface with twenty circular rubs using moderate finger pressure and a tissue soaked in a solvent, such as isopropyl alcohol, ethyl acetate, or methyl ethyl ketone. If the coating does not exhibit material degradation, softening, removal or abrading from the solvent rubbing, then the coated surface is considered solvent resistant. A solvent resistant coated print-surface is less likely to become tacky or scratched when exposed to residual ink solvents than a coating that is broken down or abraded by the test solvents.

Similarly, as described in more detail in the Examples below, the hydrophobic nature of the coating can protect a printed substrate from water degradation, including resistance to scratching as demonstrated in a wet-scratch resistance test. If the printed coating or coated print-surface of the film yields good wet-scratch resistance on a non-voided plastic substrate (such as the second side of the second skin layer), then the print side coating is water-resistant. Flint ink company's "OS Label Lyte Process Black" lithographic ink or other commonly used oxidizing lithographic inks are suitable for wet-scratch screening. Preferred embodiments showed very little damage after labeled bottles were immersed thirty minutes in water followed by five minutes of jostling against other bottles and rails in an AGR Variable Speed Bottling Line Simulator. The water- and solvent-resistant coating of this invention is functionally dissimilar from the hydrophilic coatings of prior art. The hydrophobic coating of this invention is more resistant to degradation due to absorption of liquids than prior art hydrophilic coatings. Thus, the hydrophobic filled coatings of this invention are not as prone to humidity dependent curling as films coated with purely hydrophilic coatings, especially in symmetrically coated embodiments in which the coating on the adhesive-receiving layer is the same as the coating on the print face.

When dry and, if necessary, cured (such as by UV light), the hydrophobic filled coating is largely unaffected by exposure to water or common ink solvents like alcohols, esters, and ketones. Suitable water- and solvent-resistant coatings can comprise cationic compositions, such as described in U.S. Pat. Nos. 6,025,059; 6,596,379; and blends thereof. One specific example is a cationic dispersion of hydrophobic clay (MD125) manufactured by Michelman, Inc. blended with a water-based epoxy/hardener dispersion described by Steiner et al. in U.S. Pat. No. 4,214,039.

Filler Components

The coating according to this invention comprises at least two components: (a) a water- and solvent-resistant binder component, and (b) a filler component, at least one of which is hydrophobic. Coating compositions comprises at least 30.0 wt %, or preferably at least 45 wt %, and more preferably at least 60 wt % of at least one inorganic or organic filler component in the form of particles having a mean diameter in the range of from 5.0 to 20.0 µm. The lower end of the range of mean particle size may be any value within the range of 5.0 µm to 20.0 µm, particularly 5.0 µm, 6.0 µm, 7.0 µm, 8.0 µm, 8.5 µm, 9.0 µm, 9.5 µm, 10.0 µm, 10.5 µm, 11.0 µm, 11.5 µm or 12.0 µm. Similarly, the upper limit of the range of mean particle size may be any value within the range of 5.0 µm to 20.0 µm, particularly 10.0 µm, 10.5 µm, 11.0 µm, 11.5 µm, or 12.0 µm, 13.0 µm, 14.0 µm, 15.0 µm, 15.5 µm 16.0 µm, 16.5 µm, 17.0 µm, 17.5 µm, 18.0 µm, 18.5 µm, 19.0 µm, 19.5 µm or 20.0 µm. Exemplary ranges of mean particles size are 8.0 to 18.0 µm and 10.0 to 15.0 µm. Suitable fillers comprise clay materials, natural minerals, surface-treated natural minerals, synthetic minerals, surface-treated synthetic minerals, plastic or thermoplastic pigments or particulates, similar materials, and mixtures thereof. In some embodiments, <2.0 number % of the filler particles have a diameter >75.0 µm, particularly >50.0 µm, more particularly >45.0 µm. Exemplary embodiments, the coating includes a filler having a means particle dimension in the range of 10 to 15 µm wherein <2.0 number % of the filler particles have a diameter >45.0 µm. In other embodiments, the coating includes a filler having a means particle dimension in the range of 15 to 20 µm wherein <2.0 number % of the filler particles have a diameter >65.0 µm.

It has been found that such filler components maintain advantage of reduced ghosting (a phenomenon where ink on the print face transfers to the adhesive face when the film is in roll and/or stack form) and remain suitable for cut and stack processes, while also providing reduced print face deformation observed when larger particles are used.

Filler materials may be classified into two functional groups: hydrophilic and hydrophobic. Hydrophilic or hydrophobic particles will each provide sufficient interstitial porosity to the coating to allow penetration that enables good retained adhesion in an ice chest, as taught herein, provided there is sufficient filler particle loading. Hydrophilic fillers may include silicas, hydrophilic clays, barium sulfate, calcium carbonate, titanium dioxide, zinc oxide, tin oxide, aluminum oxide, talc, carbon black, a wide variety of organic and inorganic pigments that could be used to make coated films with a specific color, and mixtures of any two or more of the foregoing, having hydrophilic properties. With hydrophilic fillers, internal particulate pore volume or porosity can influence the ability of given fillers to absorb water. Hydrophilic filler materials may preferably have low porosity or are effectively non-porous. In the context of the present invention, hydrophilic filler particles with low porosity means porosity of less than 3 milliliters/gram (ml/g) of water uptake per gram of filler material, with less than 1.5 ml/g being preferred, and less than 0.5 ml/g being more preferred. Low-porosity and non-porous hydrophilic fillers have been found to provide better properties than their more porous counterparts.

In addition to those listed previously, hydrophobic fillers commonly include, but are not limited to, surface-modified clays, surface-modified silicas, and surface-modified titanium dioxide, which have been rendered water-resistant due to their surface modification with organic moieties. Examples of surface-modified clays include gadolinite clays sold under the trade name KALOPHILE-2™ by Dry Branch Kaolin Company and Lithospheres 7015 HS and 7005 CS by Huber Engineered Minerals. An example of surface-modified silica is AEROSIIL™ RX50 manufactured by Aerosil Nippon, in Japan. In accordance with the present invention, hydrophobic fillers are preferred, because it has been found, as demonstrated herein, that they offer better post-print blocking resistance during die-cutting and, when used on the print surface, these materials offer better wet-scratch resistance.

In particular embodiments, the filler component comprises polyolefin particles. Particular polyolefins include polyethylene which as used herein refers to a polyolefin homopolymer or copolymer containing recurring units derived from ethylene. Such polyethylenes include but are not limited to polyethylene homopolymer and/or copolymer wherein at least 85% (by number) of the recurring units are derived from ethylene. The polyethylene can be a mixture or reactor blend of individual polyethylenes, such as a mixture of two or more polyethylenes. Particular embodiments include a polyethylene wax in the form or particles having a mean diameter of from 50 to 20 µm, particularly 8 to 18 µm, more particularly 5 to 15 µm. In particular embodiments, such polyethylene waxes have a weight average molecular weight in the range of 2,000 to 15,000 g/mol, particularly in the range of about 5,000 to about 10,000 g/mol. Polyethylene waxes may also have one or more of the following features 1) Mw/Mn of from about 2 to 10, a viscosity number of from 10 to 60 g/cm$^3$, a melting range of from about 129° to 131° C. for a homopolymer and about 120° to 126° C. for a copolymer, and a density of from 0.930 to 0.970 g/cm$^3$. One suitable polyethylene is an oxidized HDPE, available as Acumist™ A12 or A18 from Honeywell Specialty Additives.

Binder

The coating formulations according to this invention include a binder component in addition to the filler particulate component. Such coatings include a binder component that is resistant to both water and solvent degradation, regardless of whether the filler component is hydrophobic or hydrophilic. Examples of the water- and solvent-resistant binders include one or more polymers from the group comprising acrylics, urethanes, hardened epoxies, alkyds, polystyrene copolymers, poly(vinylidene chloride) copolymers, butadiene copolymers, vinyl ester copolymers, nitrocellulose, olefin copolymers, and mixtures thereof, cross-linked, if necessary, to render them resistant to water and polar ink solvents (alcohols, esters, and ketones). Depending upon the chemistry of the binder, one could incorporate one or more suitable cross-linking agents into the coating formulation selected from the group comprising zirconium salts of mineral acids, polyfunctional aziridine, zinc salts, zirconium salts, glyoxal, melamine-formaldehyde resins, polyfunctional isocyanates, polyfunctional amino compounds, polyfunctional vinyl compounds, and polyfunctional epoxy compounds. When carboxylated binders are used, inclusion of 0.5 to 10 parts polyfunctional aziridine, such as CX-100 from Avecia, per 100 parts of binder is preferred. For self-cross-linking cationic acrylic binders such as DAREX™ R1117 XL from W.R. Grace, preferred cross-linking can be achieved by including for every 100 parts of cationic acrylic binder up to 100 parts epoxy/hardener blends described by Steiner et al. in U.S. Pat. No. 4,214,039. Optionally, the epoxy-curing reaction can be further catalyzed by the inclusion of minor amounts of bases such as ammonia, ammonium bicarbonate, ammonium carbonate, sodium bicarbonate, sodium carbonate, propylene diamine, hexamethylene diamine, diethylene triamine, triethylamine tetramine, tetraethylene pentamine, polyethyleneimine, polypropyleneimine, tri(dimethyl aminomethyl) phenol, and 2-ethyl-4-methyl-1H-imidazole such that the pH of the coating formulation is between 5.0 and 8.0.

According to IUPAC provisional nomenclature recommendations, an ionomer is a polymer in which a small but significant proportion of the constitutional units have ionic or ionizable groups or both. Some suitable ionomers are copolymers comprising from about 50 wt % to about 98 wt %, based on the total weight of the ionomer, of one or more carbonyl-free monomers selected from the group consisting of styrene, methyl styrene isomers, halogenated styrene isomers, vinyl chloride, vinylidene chloride, butadiene, acrylonitrile, methacrylonitrile, ethylene, propylene, and butylene isomers; and from about 50 wt % to about 2 wt % of one or more of the group consisting of acrylic acid, methacrylic acid, crotonic acid, maleic acid, and itaconic acid.

Some ionomers useful in the layers and coating of the invention include copolymers comprising: from about 63 VA % to about 95 wt % of units derived from at least one of ethylene, propylene, and butylene; and from about 5 wt % to about 35 wt % of units derived from at least one of acrylic acid, methacrylic acid, crotonic acid, maleic acid, and itaconic acid, based on the total weight of the ionomer. Particular ionomers include copolymers comprising from about 65 wt % to about 95 wt % of units derived from ethylene and from about 5 wt % to about 35 wt % of units derived from acrylic acid based on the total weight of the ionomer. MICHEM™ Prime 4983R, available from Michelman Inc., Cincinnati, Ohio, is an example of a suitable ionomer and is a polymer dispersion comprising ethylene acrylic acid in aqueous ammonia. In some preferred embodiments, the ionomer comprises from about 5 wt % to about 30 wt %, more preferably 10 wt % to 20 wt % of the weight of the back-side coating, based on the total weight of the back-side coating of the film.

Any suitable amount of ionomer may be used. In particular embodiment, the backside coating comprises about 2 wt % to 60 wt %, particularly, 5 wt % to 60 wt %, more particularly about 10 wt % to 50 wt %, ionomer, based on the total weight of the backside coating.

In embodiments where the binder is an acrylic emulsion, the acrylic emulsion typically comprises unsaturated carboxylic acid-based and/or ester-based polymers. In particular embodiments, the backside coating is formed from 20 wt % to 80 wt %, particularly 25 wt % to 65 wt %, more particularly 30 wt % to 50 wt % of the acrylic emulsion.

Carboxylic acid groups can participate to cross-linking reactions. A preferred acrylic emulsion is NEOCRYL™ KX90 sold by DSM Neoresins, Waalwijk, The Netherlands. This is an iminated acrylic emulsion with a TG at 3° C. and showing remarkable compatibility with other backside coating components.

In some preferred embodiments, the coating layer includes at least one crosslinking agent with the binder, preferably a carboxyl-reactive cross-linking agent Exemplary carboxyl-reactive cross-linking agents may include coordinating metal compounds, aziridine, aminomethylol, alkylated aminomethylol, isocyanate, blocked isocyanate, epoxy, melamine-formaldehyde, oxazoline, and silane derivatives. The cross-linking agent may be provided at a level that is sufficient to cross-link firm about 5% to 35% of the acid groups present. A more preferred range may be to cross-link from about 10% to about 30% of the acid groups. A still more preferred range for the cross-linking agent would be an amount sufficient to cross-link from about 15% to about 25% of the acid groups. Preferred carboxyl-reactive cross-linking agents may include ammonium zirconium carbonate (AZCOTE™ 5800M manufactured by Hopton Technologies, Inc., Rome, Ga.) and polyfunctional aziridine (CX100™ made by DSM NeoResins, Waalwijk, The Netherlands). In still other embodiments, the ionomer and/or acrylic emulsion used in the back-side coating may be self-cross-linking.

The coating formulations for the adhesive-receiving layer (and, optionally, the print-face coating) can also contain a wide variety of optional substances including, but not limited to, wax emulsions, adhesion promoters, emulsifiers, anti-foams, defoamers, anti-static additives, security taggants, co-solvents, and other wetting or processing aids known to those skilled in the art.

One could also use non-ionic thickeners in the coating for the adhesive-receiving layer. By controlling viscosity with non-ionic thickeners such as polyvinyl alcohol, hydroxypropyl cellulose, or hydroxyethyl cellulose, one can also attenuate the roughness of the adhesive-receiving surface by controlling the size and shape of patterns in the applied coating. Such additives are generally undesirable in the printable surface, because they may compromise wet-scratch resistance.

Substrate/Core Layer

Polymeric substrates referred to herein generally include two opposing sides or surfaces. One surface of the substrate is referred to as, e.g., a top-side, front-side, or print-side of the substrate and is the side that is typically opposite the side of the substrate that is adjacent the article when the substrate is used as a label or opposite a side of the substrate that is adjacent a product when the substrate is used as a packaging substrate. The other surface of the substrate may typically be referred to as the back-side, e.g., an adhesive-receiving side, of the substrate and is typically the side of the substrate that is adjacent the article, product, or the side of the substrate that receives the labeling adhesive when the substrate is used to form a label.

The term "polymeric substrate" or "substrate" as used herein may be defined broadly to include any polymer or thermoplastic material comprising one or more monomers as a component thereof, preferably oriented polymeric film structures. The polymeric substrate may be monolayer or multilayer films, including oriented, coextruded, and laminated multilayer films, and may preferably be biaxially oriented films. The polymeric substrate may also comprise other non-thermoplastic or non-polymeric materials, such as paper, cardstock, and/or metallic or nonmetallic substrates, and/or they may be laminated to such non-thermoplastic materials, such as paper, metallic, or non-metallic substrates. The polymeric substrate includes the polymeric portion plus any non-thermoplastic components that make up the structural composition of the substrate. The polymeric substrate may include any clear, matte, cavitated, or opaque film. Many preferred embodiments may comprise an opaque or white film with substantially non-matte surfaces.

In some embodiments the preferred polymeric substrate is a polyolefin film and more preferably a biaxially oriented, multi-layer or monolayer polyolefin-based film comprising polypropylene, polyethylene, and/or polybutylene homo-, co-, or ter-polymers. Other thermoplastic substrates or layers may also be present within such film embodiments, such as polyesters. However, in other embodiments, the polymeric substrate can include substantially any thermoplastic material that forms a thin film that can be employed for packaging, labeling, or decoration. Other exemplary suitable materials may include nylon, polyethylene terephthalate, polylactic acid, and polycarbonate. The contemplated substrates also include coextrudates of the foregoing materials, laminates of any two or more of these materials or interblends of any of the materials extruded as a single base film. Polyolefin homopolymers and copolymers of propylene and ethylene may be most useful in many labeling applications. One particularly preferred polymeric substrate that is suitable as a facestock for labeling is a polypropylene-based film containing at least 80 wt % of isotactic polypropylene in at least a primary or core layer. Exemplary commercially available materials include ExxonMobil 4252 and FINA 3371.

The polymeric substrate may be coextruded with at least one skin layer or it may be laminated to at least one other film. Typically, when the film is coextruded the thickness of a skin layer may range from about 2% to about 18% of the total film thickness. Multilayer films having three or more layers, e.g., five layers and sometimes even seven layers, are contemplated. Five-layer films may include a core layer, two skin layers, and an intermediate layer between the core layer and each skin layer, such as disclosed in U.S. Pat. Nos. 5,209,854 and 5,397,635. The skin layers may include a copolymer (i.e., a polymer comprising two or more different monomers) of propylene and another olefin such as ethylene and/or 1-butene.

Another exemplary preferred substrate is a multilayer polypropylene film comprising at least one of polyethylene, polypropylene, copolymer of propylene and ethylene, copolymer of ethylene and 1-butene, terpolymers of any of the foregoing and maleic anhydride modified polymers. Another useful substrate comprises polypropylene inter-blended with a minor proportion of at least one of polyethylene, copolymers of ethylene and an alpha olefin, copolymers of propylene and an alpha olefin, terpolymers of olefins and maleic anhydride modified polymers. Multilayer, white opaque, cavitated polypropylene-based films may also be a useful substrate. Such films are described in U.S. Pat. Nos. 4,758,462; 4,965,123; and 5,209,884.

The polymeric substrate may also be treated and/or metallized on at least one side. Many preferred polypropylene polymer-film embodiments may be treated on both sides to improve adherence of the print-side coating and the adhesive to the adhesive-receiving surface. Treatment may typically comprise corona, plasma, or flame treatment. In some embodiments, treatment may also comprise applying a primer to a surface of the polymeric substrate to improve adhesion between the substrate and the back-side coating and/or the polymeric surface layer. Such treatments may facilitate uniform wetting of the coatings and/or increase surface energy to improve coating anchorage to the substrate. The surface treatment typically may be applied after orientation, "in-line" on the coating equipment, though primers may typically be applied using coating equipment. Some embodiments may possess skin layers that do not require surface treatment for acceptable coating, ink, or adhesive adherence, such as layers comprising copolymers of ethylene and/or homopolymers of polyethylene, e.g., medium or high density polyethylene. Metallization may be by vacuum deposition of aluminum or other metals. A print-face coating and printing ink may also be applied to the metallized or treated surface.

The polymeric substrates may be uniaxially oriented, or simultaneously or sequentially biaxially oriented. A typical range of orientation stretches the film 4 to 10 times its original dimension in the machine direction and 7 to 12 times its original dimension in the transverse direction. The thickness of oriented polymeric substrates is not critical and typically ranges from about 10 μm to about 100 μm.

First Skin Layer

The first skin layer has a first side and a second side and includes a thermoplastic polymer that is preferably voided (i.e., cavitated). This first side preferably is intended for receiving both the coating according to this invention thereon, and subsequently, a cold-glue type adhesive on the coating. The first skin layer may preferably have an open-cell structure and in some embodiments is on the order of 15 to 25 gauge units (0.15 mil to 0.25 mil, or 3.8 to 6.4 μm) thick. However, some substantially closed cell embodiments may also be suitable, wherein the surface is sufficiently rough or irregular to permit some superficial retention and penetration thereon of the cold-glue adhesive or moisture therefrom.

The first skin layer comprises a polymer. In one embodiment, the thermoplastic polymer of the first skin layer, that is, the layer intended for contact with the coating and/or the adhesive, comprises polyolefins, including homo-, co-polymers (including terpolymers and higher combinations of monomers, as used herein) of polypropylene and/or polyethylene. Examples of suitable polypropylenes include a standard film-grade isotactic polypropylene and/or a highly crystalline polypropylene. An example of a suitable polyethylene is high-density polyethylene. In another embodiment, the first skin layer comprises copolymers of polypropylene including comonomers of $C_2$ or $C_4$ to $C_{10}$ in an amount less than 50 wt % of the copolymer, and blends of said polypropylene homopolymers and polypropylene copolymers.

The first skin layer includes a first voiding agent to cavitate the layer during orientation. Examples of suitable cavitating agents for essentially any voided or cavitated layer includes polyamides, polybutylene terephthalate, polyesters, acetals, acrylic resins, nylons, solid preformed glass particles or spheres, hollow preformed glass particles or spheres, metal particles or spheres, ceramic particles, calcium carbonate particles, cyclic olefin polymers or copolymers (collectively, "COC's"), silicon dioxide, aluminum silicate and magnesium silicate and mixtures thereof. COC's are described in U.S. Pat. No. 6,048,608 issued to Peet et al., which is incorporated herein by reference in its entirety. The term "voiding agents" includes cavitating agents, foaming agents or blowing agents, of substantially any shape. Suitable voiding agents (i.e., cavitating agents) and voided skin layers (i.e., cavitated skin layers) are described in U.S. application Ser. No. 09/770,960, which is incorporated herein by reference.

In one embodiment, the first voiding agent makes up from about at least 15 wt % to about at least 60 wt % of the first skin layer, and more preferably, from about at least 25 wt % to about at least 50 wt % of the first skin layer and the first voiding agent may have a median particle diameter/size of from about 1 to about 5 μm and more preferably from about 1 to about 3 μm. In another embodiment, the first voiding agent comprises at least about 20 wt %, at least about 25 wt %, at least about 35 wt %, at least about 40 wt %, or at least about 50 wt % of the first skin layer and the median particle size of the voiding agent is in the 1- to 5-μm particle size range, and preferably in the 1- to 3-μm particle size range. For example, in one embodiment, the median particle size of the voiding agent is at least about 1.4 μm. In another embodiment, the median particle size of the voiding agent is at least about 3.2 μm.

In many embodiments, the voiding agent employed in either the first skin layer or the core layer is calcium carbonate in the 1- to 5-μm particle size range. More preferably the calcium carbonate employed is of a 1- to 2-μm particle size and is present in an amount of about 20 wt % to about 60 wt % of the first skin layer. For example, in various embodiments, the quantity of 1- to 2-μm calcium carbonate is at least 25 wt %, or at least 35 wt %, or at least 40 wt % of the first skin layer. For some embodiments, the upper quantity limit of the 1- to 2-μm calcium carbonate is, for example, 60 wt % or less, by weight of the respective cavitated layer, while in other embodiments the upper limit is no more than about 50 wt % of the respective cavitated layer. All percentages of calcium carbonate referred to herein are by weight, based on the total weight of the voided layer including the calcium carbonate therein.

This first skin layer may be relatively heavily voided with a suitable first voiding agent to create voids or cells to provide a desired level of porosity and/or permeability to aid absorption and/or dissipation of moisture from aqueous adhesives, among other considerations related to voided films, such as yield, stiffness and opacity. The cell or void structures are preferably substantially "open-cell" type structures, but may also be substantially "closed" or isolated cell type structures. The term "open-cell," as used herein refers to the cells having a transmissibility pathway between interconnected voids. The term "closed-cell" means that there is substantially little to no effective inter-pore interconnectivity or communication. In addition and as used herein, either term "open cell" or "closed cell" may be considered to include some degree of near-surface fluid permeation due to surface roughness, including the irregularities, voids, craters, pores, tortuosities, and cavities, formed superficially, that is, on or near the surface of a layer, such as the first side of the first layer, as may be caused by the voiding agents, other particulate additives, and/or orientation. Thereby, in many films, essentially closed cell layers, such as a print side skin layer, may exhibit some small degree of surface absorption due to these features and thus exhibit some degree of openness with respect to the cell type. Such surface features may provide small reservoirs for fluid absorption and adhesive anchoring, even though inter-pore interconnectivity with voids deeper within the first layer may be limited or substantially non-existent. Thereby, those skilled in the art will recognize that both closed-cell and open-cell layers may be capable of providing some degree of adhesive moisture absorption or transmission, though to differing extents as useful in determining whether a layer is considered substantially open cell or substantially closed cell.

When measured with an M2 Perthometer equipped with a 150 stylus from Mahr Corporation, the average surface roughness ($R_a$, output as defined in the operating manual of the Perthometer) of the first skin layer is typically greater than 0.5 µm. $R_z$ (output as defined in the operating manual of the Perthometer), which weighs larger peaks more heavily, is typically greater than 4 µm.

Core Layer

The core layer comprises a polyolefin and has a first side and a second side. The first side of the core layer is adjacent to, though not necessarily directly in contact with, the second side of the first skin layer. Preferably, the core layer has a thickness of approximately 50 to approximately 950 gauge units (13 to 240 µm); however, for better economics, the more preferred thickness of the core layer is between about 50 to about 350 gauge units (13 to 90 µm).

In one embodiment, the core layer comprises polypropylene. Preferably, the polypropylene of the core layer is either isotactic or high crystalline polypropylene. In another embodiment, the core layer comprises polyethylene. Preferably, the polyethylene is high-density polyethylene. In another embodiment, the copolymer of the core layer is a mini-random copolymer having an ethylene content on the order of 1% or less and 99% or more of the co-polymer component, such as polypropylene. In many embodiments, the core layer is voided. In such embodiments, the core layer includes a second voiding agent, which may be the same or a different agent as the first voiding agent used in voiding the first skin layer. The core layer may be voided utilizing the voiding agents listed above and in concentrations as listed above, with particle size and concentrations determined by the properties desired to impart to the core layer. In other embodiments, the core may not be voided. In either embodiment, non-void-creating particulate additives or fillers, such as titanium dioxide, can be included in the core layer to enhance opacity.

The film labels of the present invention can be relatively clear translucent or opaque. In one embodiment, the label is white opaque and may provide an excellent contrasting background for printed material applied to the second side of the core layer or to the surface of the second skin layer of the film label. In another embodiment, the label has a transparent polypropylene core layer that has a co-extruded first skin layer and second skin layer.

In another embodiment, the core layer comprises an opaque core material that is an oriented polypropylene structure cavitated in a special way to produce a pearlescent opaque appearance. A film embodiment of this type is described in U.S. Pat. No. 4,377,616 issued to Ashcraft et al; this patent is incorporated herein by reference in its entirety.

Core layers may also be multilayer structures. Thus the core layer may include a central layer with one or more layers on either side of the core layer. For convenience, the tie layer may comprise the same composition as the central core layer. However, in some embodiments, different tie layer compositions may be used to enhance bonding and/or other interaction between the central core layer and the skin layer(s) as is known in the art. In one embodiment, the thermoplastic film labels of the present invention further include a first tie layer and/or second tie layer positioned respectively between the core layer and the first skin layer and/or the core layer and the second skin layer. These tie layers may include homo-, co-, or terpolymers comprising polypropylene, polyethylene, polybutylene, or blends thereof and may have a thickness of at least about 0.3 mil (0.75 µm). The first side of the first tie layer is adjacent to the second side of the first skin layer; and the first side of the core layer is adjacent to the second side of the first tie layer. The second side of the second tie layer is adjacent to the first side of the second skin layer; and the second side of the core layer is adjacent to the first side of the second tie layer.

Optional Second Skin Layer

Many preferred embodiments also possess a second skin layer on a side of the core layer opposite the first skin layer. The second skin layer comprises a polyolefin and has a first side and a second side. The first side of the second skin layer is adjacent to the second side of the core layer, though not necessarily directly in contact with the core layer. Preferably, the second skin layer is on the order of 10 to 25 gauge units (2.5 to 6.4 µm) in thickness. Suitable polyolefins for the second skin layer include polyethylene, polypropylene, polybutylene, polyolefin copolymers, and mixtures thereof. In many label embodiments, the second skin layer is not voided or when voided, is typically only lightly voided and has a substantially closed-cell type void structure. The second/exterior side is suitable for a surface treatment such as flame, corona, and plasma treatment; metallization, coating, printing; and combinations thereof.

In one embodiment, the second side of the second skin layer is metallized or is a glossy surface that is capable of dissipating static. In another embodiment, the metallized or glossy surface is coated with a polymeric coating. In still another embodiment, the second side of the second skin layer is coated with a relatively rough, non-glossy material that is also capable of dissipating static. Such coating may be a coating having properties and components according to this invention. For example, the coating on the second side of the second skin layer may be the same coating, as used on the first side of the first skin layer. Still other embodiments will employ a voiding agent in the second skin layer and/or the core layer, wherein such voiding agent has a median particle size of 1.5 µm or less, such that when the second skin layer is metallized, a bright mirrored appearance will result. The second skin layer is preferably treated to improve surface adhesion, such as by corona treatment. In an exemplary embodiment of this invention, the skin layer intended to receive the metallized coating has a thickness of approximately 20 gauge units (5 µm) or less.

The water- and solvent-resistant coating also may be applied to a metallized, matte or glossy print-side surface to protect such side and/or to dissipate static charge therefrom. Although anti-static protection may be applied to either side of a film substrate, in most embodiments, it is not necessary to provide anti-static protection to both sides of the film structure. In each embodiment, the surfaces of the second/print skin layers may be made capable of dissipating static charge. For example, the surface resistivity may be less than 14 log ohms per square (per square geometric region as measured on a circular film sample inserted into a Keithley Model 8008 Resistivity Test Fixture with 500 volts applied using a Keithley Model 487 Picoammeter/Voltage Source, or alternatively using an Autoranging Resistance Indicator Model 880 from Electro-Tech Systems, Inc., Glenside, Pa.), when the relative humidity is greater than 50% and the metallized surface is reflective or the gloss is >30% when measured with a BYK Gardner Micro-gloss 20° meter. Adequate gloss and metallic sheen can be obtained from using a base film which is uniaxially or biaxially oriented and which has a second/print side that contains only substantially closed-cell voids, a relatively low percentage of voids, or no voids at all on the gloss or metallic second/print side. In the metallized embodiments, metal, such as aluminum, is deposited on the smooth, print side.

To further enhance gloss or to preserve metallic sheen, a smooth clear polymeric coating may be applied over the smooth second side or over the metallic layer deposited on the smooth second side. Such polymeric coating can be applied by any means known in the art including, but not limited to, application of polymeric material dispersed in water or dispersed in a solvent, and extrusion coating.

Smooth surfaces of the outer print/metallization surface of the second skin layer may preferably have an average roughness ($R_a$) of between 0.1 and 0.3 μm before metallization. ($R_a$ was measured with an M2 Perthometer from Mahr Corporation equipped with a 150 stylus.) More preferably, the value of $R_a$ is less than 0.3 μm, with $R_a$ values less than 0.15 being most preferred. When such sheets of label film stock are so smooth, the sheets tend to block together and can be very difficult to separate once all the air gets pressed from between them by the weight of the sheets in a stack. When this occurs, it can be very difficult to separate the sheets when trying to feed them into a printing press, a cutting die, or when dispensing labels on a bottling machine. Difficulties in separation can occur despite the relatively highly cavitated surface of the first skin layer which is much rougher (e.g., $R_a$>0.5) than the second side of the second skin layer. However, when the rough surface of the first skin layer is coated with the filled coating of the present invention, sheets and labels have processed well in printing presses and bottling lines.

McGee et al. (U.S. Pat. No. 6,025,059) discloses anti-abrasive particulates for improve wet-scratch resistance. While these particulates serve no critical purpose on the adhesive-receiving layer, they can be part of a symmetrically coated film that allows a single coating to be used in manufacturing for the adhesive-receiving layer and the print face. The presence of these particulates in the print face can also attenuate surface roughness, which can make sheeting, stacking, and feeding of sheets into a printing press more facile. Examples of suitable particulates that are commercially available include: TOSPEARL™ manufactured by Toshiba Silicones; SYLYSIA™ manufactured by Fuji Silysia; EPOSTAR™ manufactured by Nippon Shokubai; and TECHPOLYMER™ manufactured by Sekisui Plastics Co., Ltd.

In embodiments wherein the second side of the second skin layer is metallized, preferably, a coating is applied to the metallized surface. Such coatings may provide desirable print qualities including wet-scratch resistance, machinability enhancement, and mar resistance. Suitable examples are described in U.S. Pat. No. 6,025,059 and U.S. Patent Application 2003/0207121, which disclosures are incorporated herein by reference in their entireties. Additionally, a variety of urethanes, acrylics, polyesters, and blends thereof may also be suitable. Suitable examples are described in U.S. Pat. Nos. 5,380,587 and 5,382,473, which patents are incorporated herein by reference in their entireties.

Preferably, water- and solvent-resistant coatings applied to the metallized surface do not significantly diminish the bright mirrored appearance of the metallized surface. Similar coatings can be used on the second side of the second skin layer without metallizing. However, such structures would lose a significant contribution to the anti-static properties made by the metal and depending upon the formulation of the clear coating, anti-static additives may then be necessary in the coating formulation for the print face.

In still another embodiment, the first side of the first skin layer and the second side of the second skin layer are coated with the same rough, non-glossy material that is capable of dissipating static. Due to texture differences between the first side of the first skin layer and the second side of the second skin layer, the coated adhesive-receiving layer may be rougher than the print face, though the same coating is on both sides.

Additional Optional Additives

Other conventional additives, in conventional amounts, may be included in the coatings or films of the invention. Suitable other conventional additives include antioxidants, pigments, orientation stress modifiers, flame-retardants, anti-static agents, anti-blocking agents, anti-fog agents, and slip agents. Another class of additives that may be included in the film structures according to this invention are low molecular weight hydrocarbon resins (frequently referred to as "hard resins.") The term "low molecular weight hydrocarbon resins" refers to a group of hydrogenated or unhydrogenated resins derived from olefin monomers, such as the resins derived from terpene monomers, coal tar fractions and petroleum feedstock Such suitable resins prepared from terpene monomers (e.g., limonene, alpha and beta pinene) are PICCOLYTE™ resins from Hercules incorporated, Wilmington. Del., and ZONATAC™ resins from Arizona Chemical Company, Panama City, Fla. Other low molecular weight resins are prepared from hydrocarbon monomers, as $C_5$ monomers (e.g., piperylene, cyclopentene, cyclopentadiene, and isoprene), and mixtures thereof. These are exemplified by the hydrogenated thermally oligomerized cyclopentadiene and dicyclopentadiene resins sold under the trade name ESCOREZ™ (i.e., Escore 5300) by ExxonMobil Chemical Company of Baytown, Tex. Others are prepared from $C_9$ monomers, particularly the monomers derived from $C_9$ petroleum fractions which are mixtures of aromatics, including styrene, methyl styrene, alpha methyl styrene, vinyl naphthalene, the indenes and methyl indenes and, additionally, pure aromatic monomers, including styrene, a-methyl-styrene and vinyltoluene. Examples of these resins include hydrogenated a-methyl styrene-vinyl toluene resins sold under the trade name REGALREZ™ by Hercules incorporated of Wilmington, Del.

Film Properties

Thermoplastic films and labels according to the present invention may typically have an overall thickness, including the skin layer(s), the core layers and any additional layers, of from about 1 mil to about 10 mils (25 to 250 μm), preferably from about 3 mils to about 5 mils (75 to 125 μm), with many embodiments comprising a three- to five-layer white opaque film. In some label film embodiments, the adhesive-receiving first skin layer makes up at least about 15 wt % of the film label. In another embodiment, the first skin layer comprises at least about 30 wt % of the film label. Preferably, the thermoplastic films useful according to this invention, including the label films, are biaxially oriented. In another embodiment, the films are uniaxially oriented.

In film substrate embodiments comprising a cavitated first skin layer and a core layer, and optionally including a first tie layer, the density of the film substrate, excluding any coatings, metallization, and printing inks, etc., is preferably within a range of at least about 0.3 g/cc to about 0.8 g/cc. A lower bulk density may result in a film of unsuitable matrix/structural integrity, unless laminated to a stronger layer, and a higher bulk density may provide insufficient porosity for the effective absorption of moisture from the cold glue adhesive. These bulk density limits may vary somewhat, in films with relatively thick cores or relatively thin skins. For example, a film having a heavily cavitated core and/or tie layer may be cavitated such that the bulk density is slightly lower than 0.3 g/cc, while a film comprising a relatively thin cavitated first skin layer with relatively thick non-cavitated tie and core layers may exhibit a bulk density in excess of 0.8 g/cc. Thus, the term "about" is intended to incorporate such film structures that fall outside of the stated range but which are otherwise utilized according to this invention.

Exemplary Methods of making Embodiments of the Invention

The coatings, methods, and uses according to this invention are particularly useful in the preparation of cold-glue/wet-adhesive applied labels. The thermoplastic film labels of the present invention are coated on at least one side with at least one water- and solvent-resistant coating containing fillers, which are preferably hydrophobic and preferably sub-μm sized. The printed, cut, stacked, and coated labels can be applied to containers using wet/cold glue. Despite being resistant to water, the hydrophobic filled coating unexpectedly does not interfere with the tack-up or curing of the wet glue. With such glues, these coated labels unexpectedly retain good adhesive properties under various conditions, including wet, moist or humid environment conditions. Moreover, because these coatings are also resistant to solvents, post-print processing of the labels (die-cutting, for example) may be more robust than prior art polymeric labels.

The present invention also includes containers or substrates labeled with the thermoplastic film labels according to this invention. Such labels provide several advantages over currently used paper and polymeric labels. In less demanding applications, the coatings of this invention may be used on the print side and/or the adhesive-receiving layer of paper labels to make some of the advantages realized from this invention available to paper label applications.

The coating can be applied to the exterior surface of the first skin layer (and optionally, alternatively or additionally to the second skin layer or print face) by any means known in the art including, but not limited to, spraying, dipping, direct gravure, reverse direct gravure, air knife, rod, and offset methods or combinations thereof. In one embodiment, the subject coatings of this invention comprise a water- and solvent-resistant polymer as a continuous or "binder" phase, with hydrophobic particles, such as clay or surface-treated minerals, as the particulate, discontinuous or "filler" phase of the formulation. In addition, there may be present, other performance-enhancing additives, such as emulsifiers, waxes, hydrocarbon resins, matting agents, silicas, plastic particles, cross-linkers, anti-block agents, and/or other additives known in the art.

Coating formulations according to this invention also demonstrate desirable characteristics when applied to the print-face of a polymer film. Some lithographic inks and over-lacquers contain hydrocarbon-based solvents or components therein and may generally be characterized as hydrophobic in nature. Similarly, many untreated polymeric films may also have hydrophobic tendencies. When hydrocarbon-solvent based fluids contact an oriented, untreated polymeric film, the fluids may be partially absorbed into the polymer film where the solvent fluid may react chemically and/or physically with the oriented polymer to cause some minor degree of relaxation of the orientation forces or alterations of the crystalline phases within the polymer matrix, resulting in some puckering or distortion of the contacted portion of the polymer film. The extent of such effect may be related to the amount of solvent that enters the polymer structure.

Polymer film coated with a primarily hydrophilic coating have been observed to fail to adequately protect the film from the solvent-based fluid, permitting the solvent-based fluid to penetrate through the hydrophilic coating and absorb into the polymer film.

Films described by pending U.S. Patent Application Publication Nos. 2002/0146520; 2003/0172559; and U.S. Pat. No. 7,288,304, disclose representative substrates that are suitable for receiving the water- and solvent-resistant filled coating of this invention. These aforementioned applications are incorporated herein by reference in their entireties.

Preferably, the adhesives used with the present invention are water-based adhesives, including cold glues as commonly used in container or bottle labeling operations. Water-based adhesives are well known in the art for use with traditional paper labels.

As referenced herein, adhesive is applied to the first side of the first skin layer of the films of the present invention. Cold glue adhesives generally comprise solid base materials in combination with water. In one embodiment, the cold gke is an aqueous solution of a natural adhesive (e.g., casein). In another embodiment, the cold glue is an aqueous solution of a resin [e.g., poly(vinyl acetate) {PVA} or ethylene vinyl acetate {EVA}]. Cold glues are widely used as an economical alternative to wrap around or pressure sensitive labels. Some cold glues are a colloidal suspension of various proteinaceous materials in water and are derived by boiling animal hides, tendons, or bones that are high in collagen. Alternatively, cold glue can be derived from vegetables (e.g., starch, dextrin) Some cold glues are based on synthetic materials (resins). Examples of cold glues which are suitable for the practice of the present invention include HB Fuller WB 5020, National Stare CYCLOFLEX™ 14-200A, AABBITT 712-150; and Henkel OPTAL™ 10-7026; Henkel OFTAL™ 10-7300, and Henkel OPTAL™ 10-7302.

The coated film labels comprising the water-based adhesive are attached to containers by means known in the art. The containers have a surface that is adjacent to the glue applied to the coated first/adhesive-receiving side of the first skin layer of the label. Suitable materials for the container include glass, ceramics, thermoplastics, metal and other materials. The present invention provides containers having a thermoplastic film label. These containers include a surface of the container; a water-based adhesive adjacent to the container surface; and a hydrophobic-coated thermoplastic film label. The coated thermoplastic film label is as described above.

In some embodiments, the core and/or tie layer(s) may also include a conventional non-void-inducing filler or pigment such as titanium dioxide. Generally, from an economic viewpoint at least, it has not been considered to be of any particular advantage to use more than about 10 wt % of titanium dioxide to achieve a white label suitable for printing. Greater amounts could be added for greater opacity so long as there is no undue interference with achieving the desired properties of the thermoplastic label.

Particular Embodiments

In one embodiment, the label film comprises three layers; that is, a first skin layer on the adhesive-receiving side of the film, a core/interior layer and a second skin layer on the side of the core layer opposite the first skin layer.

This invention also comprises an article, such as glass, metal, or plastic bottle, box, or other packaging element such as may be useful for packaging a packaged product, labeled with a polymeric label that is coated according to this invention. Such labels contain the resistant coating on at least the adhesive-receiving side of the polymeric label and are adhered to the article using a cold glue adhesive. Optionally, the label may comprise an embodiment of this coating on the print side of the label. The adhesive-coated label is then applied to a labeling surface on the article. A labeling surface means substantially any surface or portion of the article that is appropriate for adhering the label thereto.

In addition to the coating formulation, film/label structures and use described herein, this invention also includes a method of labeling an article with a resistant coated polymeric label using a cold glue adhesive comprising the steps of: a) providing an article having a labeling surface; b) providing a polymeric label substrate having a first side and a second side, wherein the first side is an adhesive-receiving side; c) applying a coating to the first side of the polymeric label substrate, the coating comprising at least a filler component and a binder component, wherein at least one of the filler component and the binder component is substantially hydrophobic; d) thereafter applying a cold glue adhesive to the coating; and e) thereafter applying polymeric label to the article to produce a labeled article.

In addition to the method of labeling an article, this invention also comprises a method of preparing a coated label for use with a cold glue adhesive, comprising the steps of: a) providing a polymeric label substrate having a first side and a second side, wherein the first side is an adhesive-receiving side; b) thereafter coating the adhesive-receiving first side of the polymeric label substrate with a coating to form a coated label substrate that is water- and solvent-resistant, said coating comprising at least a filler component and a binder component, at least one of which is substantially hydrophobic; and c) thereafter drying the coating on the resistant coated label substrate to form a coated label. In some embodiments, the adhesive receiving skin layer may also be voided, such as by calcium carbonate or PBT particles.

The methods according to this invention may further comprise the steps of metallizing, printing, applying an embodiment of the herein described coating, and/or applying an anti-static coating to the second side of the label substrate.

The step of providing an article comprising a labeling surface includes articles such as glass, metal, or polymeric bottles, boxes, and product packaging, containers, and vessels.

This disclosure is merely illustrative and descriptive of the invention by way of example and various changes can be made by adding, modifying, or eliminating details without departing from the fair scope of the teaching contained in the disclosure. It will be recognized by those skilled in the art that various changes to the embodiments or methods herein as well as in the details may be made within the scope of the attached claims without departing from the spirit of the invention. However, such modifications and adaptations are within the spirit and scope of the present invention.

EXAMPLES

Comparative Example 1

The following examples refer to or utilize a commercial film produced by ExxonMobil, namely, 85 LP200. This film is a biaxially oriented five-layer opaque film, typically utilized in certain labeling applications and having the following structure. All percentages shown are based upon weight:

| Adhesive Coating | |
|---|---|
| Skin Layer 1 (5-30%) | OPP or HCPP + 20-60% CaCO$_3$ + 0-15% Antiblock |
| Tie Layer 2 (5-30%) | OPP or HCPP + 0-60% CaCO$_3$ |
| Core Layer 3 (20-85%) | OPP or HCPP + 0-15% CaCO$_3$ |

| Adhesive Coating | |
|---|---|
| Tie Layer 4 (1-5%) | OPP or HCPP + 0-10% Antistat |
| Layer 5 (0.6-17%) | Propylene-ethylene copolymer |
| Print-receiving surface (with or sans metal) | |

The term "OPP" means polypropylene resin, the term "HCPP" means high crystallinity polypropylene resin, and "CaCO$_3$" means calcium carbonate.

The adhesive receiving surface is provided by applying the adhesive surface coating. Samples of 85 LP200 are coated with about 2.3 g/m$^2$ of clay-filled coating containing an emulsion-based binder, a filler component having a mean diameter of 30-40 μm and a largest particle diameter of 125 μm, available as MD145 from Michelman, Inc. The filler component is provided as a emulsion comprising 2.5 dry parts (all parts are on a dry basis) hydrophobic clay (LITHOSPERSE™ 7005 CS from Huber, a clay treated with an inorganic material to render the clay hydrophobic) per 1.0 dry parts of R1117 XL (a cationic acrylic emulsion from W. R. Grace) as the binder. Thus, the coating contains about 71 wt % filler, not counting other formulation additives. The print face comprises the same composition as the coating layer.

Example 1

Comparative Example 1 is substantially reproduced except that the filler of Comparative Example 1 is replaced with a filler comprising 13.7 phr (per 100 phr R1117XL) polyethylene particles (ACUMIST™ A18 from Honeywell, Inc.) having a mean particle diameter of 18 μm (individual batches ranged from 16 to 19 μm) and a and a largest particle diameter of 62 μm.

Example 2

Comparative Example 1 is substantially reproduced except that the filler of Comparative Example 1 is replaced with a filler comprising 13-7 phr (per 100 phr R1117XL) polyethylene particles (ACUMIST™ A12 from Honeywell, Inc.) having a mean particle diameter of 12 μm (individual batches ranged from 10 to 13 μm) and a largest particle diameter of 44 μm.

Coated samples of 85 LP200 according to the Examples are evaluated for suitability for both cut and stack and roll-fed processes. Lower numbers are better. The following table shows the results:

TABLE 1

Summary of Testing Results

| | Comp. Ex. 1 | 18 μ particle | 12 μ particle |
|---|---|---|---|
| Print Face Deformation | Control/normal | improved | improved |
| Sheeting/Sheetability | Control/normal | improved | Much improved |
| Ghosting | Control/normal | improved | improved |
| Moisture Absorption/ Wettability | Control/normal | improved | improved |
| Tantec Testing Average change in angle (degrees) in 5 minutes | −11.5 | −18.5 | −16.3 |

What is claimed is:

1. A coated label film for use with a cold glue adhesive, the label film comprising:
   (a) a polymeric substrate comprising:
      (i) a first skin layer comprising a polymer, wherein the first skin layer has a first side and a second side and is voided;
      (ii) a core layer comprising a polymer, wherein the core layer has a first side and a second side, and the first side of the core layer is adjacent to the second side of the first skin layer;
   (b) a first coating on the first side of the first skin layer comprising at least 30 wt % of a first filler component, the filler component comprising polyethylene homopolymer or copolymer particles having a mean diameter in the range of greater than 10 µm to equal to 20 µm and <2.0% of the filler particles have a diameter >75.0 µm, and a first binder component, the first binder comprising:
      (i) at least an ionomer having about 65 wt % to about 95 wt % of polymer units derived from at least one of ethylene, propylene, butylene, and one or more carbonyl-free monomers; and from about 5 wt % to about 35 wt % of polymer units derived from at least one of acid-group containing comonomer selected from acrylic acid, methacrylic acid, crotonic acid, maleic acid, itaconic acid and mixtures thereof,
      (ii) an acrylic emulsion,
      (iii) a first cross-linking agent, and
   wherein at least one of the first filler component and the first binder component is hydrophobic.

2. The coated film according to claim 1, wherein the polymeric substrate (a) further comprises:
   (iii) a second skin layer comprising a polymer, wherein the second skin layer has a first side and a second side, the first side of the second skin layer is adjacent to the second side of the core layer, and the second side of the second skin layer is suitable for a surface treatment selected from the group consisting of flame, corona, plasma, metallization, coating, printing, and combinations thereof.

3. The coated film according claim 2, further comprising: a second coating comprising at least a second filler component and a second binder component, the second coating applied to the second side of the second skin layer, wherein at least one of the second filler component and the second binder component is hydrophobic.

4. The coated film according to claim 3, wherein the composition of the second coating is identical to the composition of the first coating.

5. The coated film according to claim 3, wherein the second coating is applied to the film at a weight of from about 0.1 g/m² to about 4.0 g/m².

6. The coated film according to claim 3, wherein the second coating is the same composition as the first coating and wherein the second coating has a surface roughness (Ra) greater than 0.20 µm.

7. The coated film according to claim 1, wherein the first filler component comprises at least one of: a) a clay material; b) a natural mineral material; c) a surface-treated natural mineral; d) a synthetic mineral; e) a surface-treated synthetic mineral; f) plastic pigments; and g) thermoplastic pigments.

8. The coated film according to claim 1, wherein the first filler component comprises at least one of: a) a surface-modified clay; b) a surface-modified silica; and c) a surface-modified titanium dioxide.

9. The coated film according to claim 1, wherein the first filler component comprises a polyolefin.

10. The coated film according to claim 1, wherein the first filler component comprises polyethylene.

11. The coated film according to claim 1, wherein the first coating further comprises: at least one of organic particles, inorganic particles, silica gel, anti-static material, wetting agents, surfactants, security taggants, pH modifiers, and buffering agents.

12. The coated film according to claim 1, wherein the first coating is applied to the film at a weight of from about 0.1 g/m² to about 4.0 g/m².

13. The coated film according to claim 1, wherein the first coating is applied to the film at a weight of from about 0.2 g/m² to about 2.5 g/m².

14. The coated film according to claim 1, wherein the first coating is applied to the film at a weight of from about 0.8 g/m² to about 2.0 g/m².

15. The coated film according to claim 1, wherein the first filler component comprises at least 45 wt % of the first coating.

16. The coated film according to claim 1, wherein the first filler component comprises at least 60 wt % of the first coating.

17. The coated film according to claim 1, wherein the first binder is hydrophobic and the first filler material is hydrophilic, the first filler comprising at least one of: a) silica; b) hydrophilic clays; c) barium sulfate; d) calcium carbonate; e) titanium dioxide; f) zinc oxide; g) tin oxide; h) aluminum oxide; i) talc; j) carbon black; and k) another pigment.

18. The coated film according to claim 1, wherein the first crosslinking agent comprises at least one of zirconium salts of mineral acids, polyfunctional aziridine, zinc salts, zirconium salts, glyoxal, melamine-formaldehyde resins, polyfunctional isocyanates, polyfunctional amino compounds, polyfunctional vinyl compounds, and polyfunctional epoxy compounds.

19. The coated film according to claim 1, wherein the first coating further comprises at least one of wax emulsions, adhesion promoters, emulsifiers, anti-foams, defoamers, anti-statics, security taggants, co-solvents, wetting aids, and processing aids.

20. The coated film according to claim 2, further comprising: a first tie layer between the core layer and the first skin layer and optionally a tie layer between the core layer and the second skin layer.

21. The coated film according to claim 1, wherein the first skin layer comprises a voiding agent selected from the group consisting of polyamides, polybutylene terephthalate, polyesters, acetals, acrylic resins, solid preformed glass particles, hollow preformed glass particles, metal particles, ceramic particles, calcium carbonate, cyclic olefin polymers, cyclic olefin copolymers, silicon dioxide, aluminum silicate, magnesium silicate and mixtures thereof.

22. The coated film according to claim 1, wherein the core layer comprises a voiding agent selected from the group consisting of polyamides, polybutylene terephthalate, polyesters, acetals, acrylic resins, solid preformed glass particles, hollow preformed glass particles, metal particles, ceramic particles, calcium carbonate, cyclic olefin polymers, cyclic olefin copolymers, silicon dioxide, aluminum silicate, magnesium silicate and mixtures thereof.

23. The coated film according to claim 1, wherein the polymeric substrate without the first coating has a density of from about 0.30 g/cc to about 0.80 g/cc.

24. The coated film according to claim 1, wherein the first coating is in the form of a continuous layer on the first side of the first skin layer.

25. The coated film according to claim 1, wherein the first coating is in the form of a pattern or non-continuous layer on the first side of the first skin layer.

\* \* \* \* \*